(12) United States Patent
Faga et al.

(10) Patent No.: US 11,769,119 B1
(45) Date of Patent: Sep. 26, 2023

(54) AUTONOMOUS CAR REPAIR

(71) Applicant: Allstate Insurance Company, Northbrook, IL (US)

(72) Inventors: Mark E. Faga, Evanston, IL (US); Paul Albert Sheetz, Minneapolis, MN (US)

(73) Assignee: Allstate Insurance Company, Northbrook, IL (US)

( * ) Notice: Subject to any disclaimer, the term of this patent is extended or adjusted under 35 U.S.C. 154(b) by 521 days.

(21) Appl. No.: 14/687,542

(22) Filed: Apr. 15, 2015

(51) Int. Cl.
*G06Q 10/00* (2023.01)
*G07C 5/00* (2006.01)
*G06Q 10/20* (2023.01)

(52) U.S. Cl.
CPC .................... *G06Q 10/20* (2013.01); *G07C 5/008* (2013.01)

(58) Field of Classification Search
CPC .............................. G07C 5/008; G06Q 10/20
See application file for complete search history.

(56) References Cited

U.S. PATENT DOCUMENTS

| | | | |
|---|---|---|---|
| 7,302,371 B2 | 11/2007 | Oesterling et al. |
| 7,324,951 B2 | 1/2008 | Renwick et al. |
| 7,376,497 B2 | 5/2008 | Chen |
| 7,457,693 B2 | 11/2008 | Olsen et al. |
| 7,571,036 B2 | 8/2009 | Olsen et al. |

(Continued)

FOREIGN PATENT DOCUMENTS

| | | | |
|---|---|---|---|
| CA | 2689865 A1 | 7/2005 | |
| CN | 1543622 A * | 11/2004 | .............. B60R 25/2081 |

(Continued)

OTHER PUBLICATIONS

Absolute predictability at your disposal, Active control of vehicle needs, info@cobratelematics.es, date unknown but believed to be prior to filing of this application.

Always by your side, Service and routing as keys, http://www.easydriver.es, date unknown but believed to be prior to filing of this application.

(Continued)

*Primary Examiner* — Tan D Nguyen
(74) *Attorney, Agent, or Firm* — Foley & Lardner LLP

(57) ABSTRACT

A system comprising a telematics device associated with a vehicle, a first computing device, a second computing device associated with a driver of the vehicle, and a server is disclosed. The server may be configured to receive maintenance data from the telematics device, determine a repair for the vehicle based on the maintenance data, send a request to the first computing device for the repair to be performed by one or more service providers, estimate a period of time for performing the repair, assign an alternative form of transportation to be provided to the driver during the estimated period of time, and send, to the second computing device, one or more notifications regarding at least one of the repair to be performed by the one or more service providers, the estimated period of time for the repair, or the assigned alternative transportation to be provided to the driver.

20 Claims, 8 Drawing Sheets

(56) References Cited

U.S. PATENT DOCUMENTS

| | | | |
|---|---|---|---|
| 7,860,738 B2 | 12/2010 | Simon et al. | |
| 7,945,359 B2 | 5/2011 | Watkins et al. | |
| 8,244,564 B2* | 8/2012 | Selinger et al. | ... G06Q 30/0601 705/7.11 |
| 8,255,304 B1* | 8/2012 | Lorenzo | ............... G06Q 40/00 705/35 |
| 8,306,687 B2 | 11/2012 | Chen | |
| 8,768,565 B2 | 7/2014 | Jefferies et al. | |
| 8,775,222 B2 | 7/2014 | Smith et al. | |
| 10,354,230 B1* | 7/2019 | Hanson et al. | ......... G07B 15/00 |
| 2002/0188479 A1* | 12/2002 | Renwick et al. | ....... G06Q 40/08 705/4 |
| 2004/0111165 A1* | 6/2004 | Yokota et al. | ..... G05B 19/4183 700/2 |
| 2005/0216151 A1 | 9/2005 | Gawlik et al. | |
| 2005/0251304 A1 | 11/2005 | Cancellara et al. | |
| 2006/0047383 A1* | 3/2006 | Kwon | ................. G06Q 10/109 701/32.5 |
| 2006/0155575 A1* | 7/2006 | Gross | ................ G06Q 30/0269 705/14.66 |
| 2007/0038506 A1 | 2/2007 | Noble et al. | |
| 2007/0067075 A1 | 3/2007 | McMillan et al. | |
| 2008/0062990 A1* | 3/2008 | Oran | ............... H04L 29/08585 370/392 |
| 2009/0024423 A1* | 1/2009 | Hay et al. | ............... G06Q 10/02 705/5 |
| 2009/0103916 A1* | 4/2009 | Dolan, III | .......... H04L 41/0213 398/9 |
| 2009/0248235 A1* | 10/2009 | Hering et al. | .......... G06F 17/00 701/29.1 |
| 2010/0122212 A1* | 5/2010 | Boudalier | ........... G06F 17/3089 715/811 |
| 2011/0161227 A1* | 6/2011 | Santo, Jr. | ............... G06Q 10/10 705/40 |
| 2012/0066010 A1 | 3/2012 | Williams et al. | |
| 2012/0297337 A1 | 11/2012 | St. Denis et al. | |
| 2013/0006769 A1* | 1/2013 | Schalk et al. | ...... G06Q 30/0266 705/14.54 |
| 2013/0138460 A1* | 5/2013 | Schumann, Jr. et al. | ................... G06Q 50/30 705/4 |
| 2013/0304515 A1* | 11/2013 | Gryan et al. | ........... G06Q 40/08 705/4 |
| 2013/0317666 A1* | 11/2013 | Sekiyama | .............. G07C 5/008 701/1 |
| 2013/0317862 A1* | 11/2013 | Fernandes et al. | .... B60W 40/09 705/4 |
| 2014/0012460 A1* | 1/2014 | Kleinschmidt et al. | G06Q 10/20 701/31.5 |
| 2014/0088866 A1* | 3/2014 | Knapp et al. | .......... G06Q 10/06 701/467 |
| 2014/0142889 A1* | 5/2014 | Chuong | ................. G01B 21/28 702/156 |
| 2014/0226010 A1 | 8/2014 | Molin et al. | |
| 2014/0257868 A1* | 9/2014 | Hayward et al. | ........ B60C 1/00 705/4 |
| 2014/0279709 A1* | 9/2014 | Lander et al. | ......... G06Q 10/08 705/400 |
| 2015/0046292 A1* | 2/2015 | Zamer et al. | ....... G06Q 30/0629 705/26.64 |
| 2015/0170439 A1* | 6/2015 | Chen et al. | ............ G07C 5/008 701/31.4 |
| 2015/0213519 A1* | 7/2015 | Krishnamurthy et al. | ................. G07C 5/008 705/35 |
| 2015/0262119 A1* | 9/2015 | Santo, Jr. | ............ G06Q 10/087 705/28 |
| 2015/0348178 A1* | 12/2015 | Taylor et al. | ...... G06Q 30/0645 705/307 |
| 2016/0162829 A1* | 6/2016 | Bellini, III et al. | ....................... G06Q 10/063118 705/7.17 |
| 2016/0239921 A1* | 8/2016 | Bray et al. | ............. G06Q 40/08 |

FOREIGN PATENT DOCUMENTS

| | | | | |
|---|---|---|---|---|
| CN | | 101067852 A | * 11/2007 | ............ G05B 19/41865 |
| JP | | 2003058652 A | * 2/2003 | |
| WO | | 2004114055 A2* | 12/2004 | ................. G06Q 10/00 |
| WO | | 2015114384 A1* | 8/2015 | |

OTHER PUBLICATIONS

B&B Electronics, The Service Provider's Smart Connection For Fleet Management, Intelligent Fleet Management Solutions Start with the Right Analytics, pp 1-11, 3014, date unknown but believed to be prior to the filing of this application.

Fleet Genius, Automate Fleet Maintenance Management Scheduling For Your Vehicles, date unknown but believed to be prior to the filing of this application.

Fleet Genius, Fleet Genius Fleet Management Software Reduces The Cost Of Managing And Maintaining Your Vehicles, Prova Systems, 5 pages, date unknown but assumed prior to filing of application.

Fletcher, Automotive Fleet, Commercial Fleets See Cost Savings from Telematics, Commercial Fleets are utiizing TELEMATICS to increase efficiencies and driver safety and save money. One fleet uses its system as a dispatch tool for service technicians, pp 20-24, dated Feb. 2010.

GPS Filet Tracking Verizon Networkfleet's Innovative GPS Vehicle Tracking Technology, Fleet Management Solutions for Your Business, dated 2014.

Hyun-Jeong Yun, "Vehicle-generated Data Exchange Protocol for Remote OBD Inspection and Maintenance," 2011, IEEE, pages 81-84. (Year: 2011).*

IBanez, Juan, "Integration Challenges of Intelligent Transportation Systems with Connected Vehicle, Cloud Computing, and Internet of Things Technologies", Dec. 2015, IEEE Wireless Communications, pages 122-128. (Year: 2015).*

Ivan Studnia, "Survey on Security Threats and Protection Mechanisms in Embedded Automotive Networks", 2013, IEEE Explore, pages 1-12. (Year: 2013).*

Mathias Johanson, "Remote Vehicle Diagnostics over the Internet using the DoIP Protocol", 2011, the 6th International Conference on Systems and Networks Communications, pages 226-231. (Year: 2011).*

NSTSCE, Market Guide to Fleet Telematics Services, pp. 1-55, date unknown but believed to be prior to the filing of this application.

Professional costs' control, Savings and quality under a single united service, Website http://www.easydriver.es, date unknown but believed to be prior to the filing of this application.

Sarah Schulz Mukisa, "Cyber-security challenges of Agent Technology in Intelligent Transportation Systems", 2014, ACySe '14, May 6, 2014, pages 1-4. (Year: 2014).*

Telogis, Verizon Networkfleet, Top Fleet Management Software Products, date unknown but believed to be prior to the filing of this application.

Van Der Peere, "Common protocols and APIs for the remote installation, operation, upgrading and removal of automotive services", Oct. 1, 2006, pages 1-5, see abstract. (Year: 2006).*

Zonar Connected, Turn Vehicle Tracking Into A High-Return Platform, V3: Fleet GPS Tracking/vehicle Diagnostics System, date unknown but believed to be prior to the filing of this application.

* cited by examiner

AUTONOMOUS CAR REPAIR

BACKGROUND

Vehicles often need routine maintenance, including inspections, tune-up services, and the like to ensure proper operation. Drivers may take their vehicles to an auto shop where technicians or service providers may conduct monthly or yearly inspections or other vehicle services. Furthermore, drivers may need to replace certain car parts that undergo typical wear and tear due to vehicle age, mileage, driving conditions, and the like. Drivers may purchase the car parts that need to be replaced and go to an auto shop where technicians may be able to replace the damaged part by installing a new part.

In addition to routine maintenance and part replacements, vehicles are also subject to being damaged in roadside incidents such as car accidents. Drivers may once again need to take their vehicles to a repair shop to have the vehicle repaired. In all of these instances of routine inspections, tune-up services, part replacements, and car repairs, the very task of going to an auto shop or car repair shop may be time-consuming for drivers. For example, a driver may need to take a day off from work (e.g., a sick day, a vacation day, a half day, etc.) and spend a significant amount of time waiting at a car repair shop. That is, the driver may spend hours or even an entire day at the car repair shop before his or her car is finally serviced. While the actual car service or repair might not take that long, the driver may have to wait for several hours before a technician is able to work on the vehicle.

Thus, drivers may dread having to go to the auto shop whether for routine maintenance or for major or minor car repairs. These conventional methods for maintenance or repair services may be an inefficient use of time for drivers. As such, new systems, methods, and devices may be desired to assist in providing vehicle maintenance services to drivers in a timely and convenient manner.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing computerized methods, systems, devices, and apparatuses for providing an autonomous car repair system to provide car care to vehicles for drivers in an efficient manner. The disclosure describes a system comprising a telematics device associated with a vehicle, a first computing device, a second computing device associated with a driver of the vehicle, and a server. The server may be configured to receive, from the telematics device, maintenance data regarding a status of the vehicle, determine a repair for the vehicle based on the maintenance data, send, to the first computing device, a request for the repair to be performed for the vehicle by one or more service providers, estimate a period of time the one or more service providers are expected to take to perform the repair, based on the estimate, assign an alternative form of transportation to be provided to the driver associated with the vehicle during the estimated period of time for the repair, and send, to the second computing device, one or more notifications regarding at least one of the repair being performed by the one or more service providers, the estimated period of time for the repair, or the assigned alternative form of transportation to be provided to the driver.

The disclosure also describes an apparatus comprising at least one processor, a network interface configured to communicate, via a network, with a first computing device and a second computing device, and a memory storing computer-readable instructions that, when executed by the at least one processor, cause the apparatus to receive, from the first computing device, maintenance data regarding a status of a vehicle, determine a repair for a vehicle based on the maintenance data, send, to the second computing device, a request for the repair to be performed for the vehicle by one or more service providers, estimate a period of time to be taken by the one or more service providers to perform the repair, based on the estimate, assign an alternative form of transportation to be provided to a driver associated with the vehicle during the estimated period of time for the repair, and in response to assigning the alternative form of transportation, send, to a third computing device, one or more notifications informing the driver that maintenance service is scheduled to be performed.

In addition, aspects of this disclosure provide a method that includes receiving, from a telematics device associated with a vehicle, maintenance data regarding a status of the vehicle, determining, by one or more computing devices, a repair for the vehicle based on the maintenance data, sending, to a first computing device, a request for the repair to be performed for the vehicle by one or more service providers, estimating, by the one or more computing devices, a period of time needed by the one or more service providers to perform the repair, based on the estimate, assigning, by the one or more computing devices, an alternative form of transportation to be provided to a driver associated with the vehicle during the estimated period of time for the repair, and sending, to a second computing device associated with a driver of the vehicle, one or more notifications regarding at least one of the repair being performed by the one or more service providers, the estimated period of time for the repair, or the assigned alternative form of transportation to be provided to the driver.

Of course, the methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example, and is not limited by, the accompanying figures in which like reference numerals indicate similar elements and in which.

DETAILED DESCRIPTION

Figure 1:
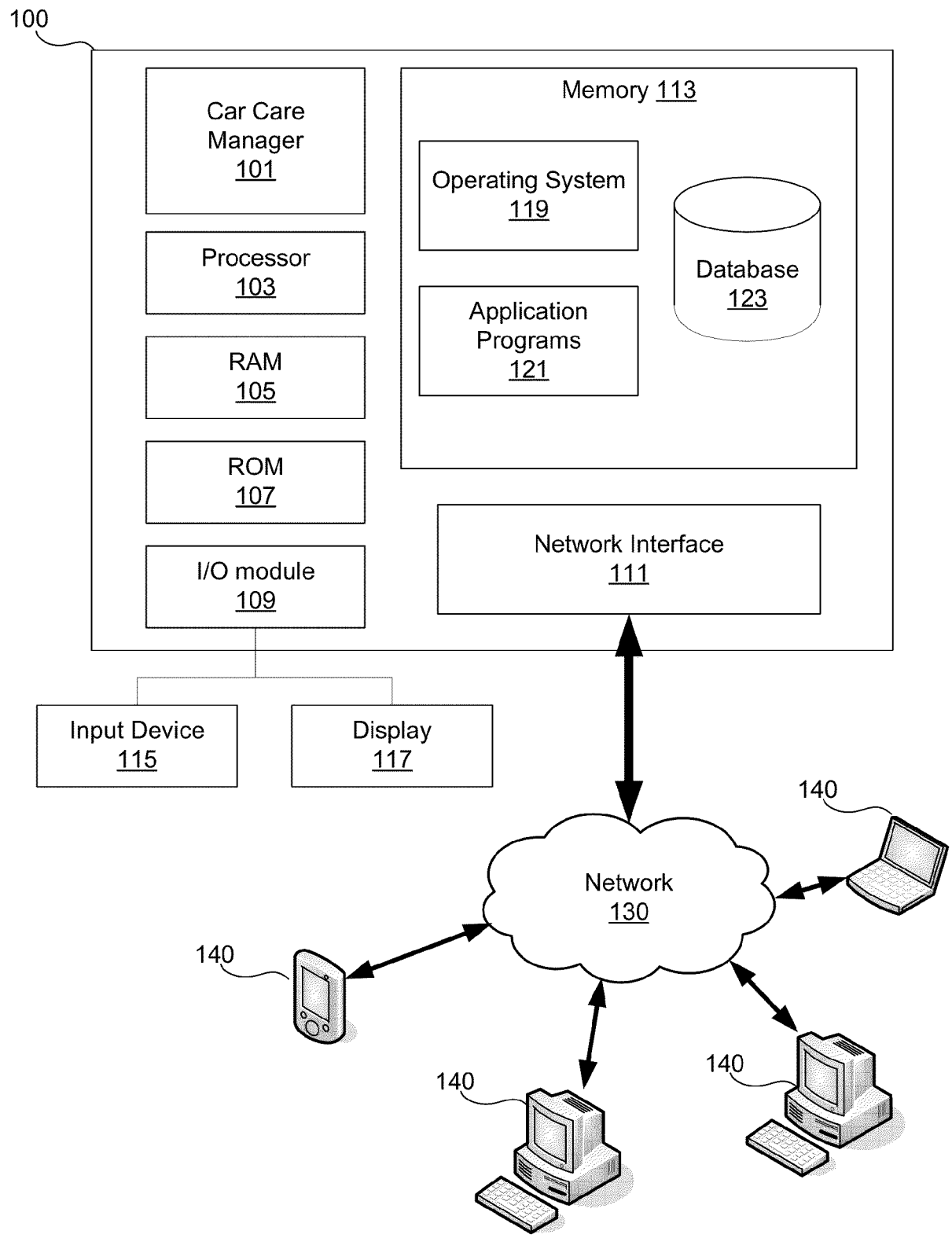
FIG. 1 depicts a block diagram of an example car care device that may be used in accordance with one or more example embodiments.

In accordance with various aspects of the disclosure, computerized methods, systems, devices, and apparatuses are disclosed that provide an autonomous car repair system for detecting maintenance related issues with a vehicle, determining a repair for the vehicle, requesting for one or more service providers to pick up the vehicle for the repair, estimating a period of time needed by one or more service providers to perform the repair, assigning an alternative form of transportation to be provided to a driver during the estimated period of time, and notifying the driver accordingly. In some embodiments, the autonomous car repair system may be referred to as a car care system as described herein.

In particular, the present disclosure teaches a car care system that may be beneficial in providing drivers with routine vehicle maintenance and/or repairs in an efficient manner. The car care system may be integrated across a plurality of platforms and may be employed by an insurance company that offers car care benefits or services to drivers (e.g., insurance policy holders). That is, the insurance company may offer car care benefits to drivers who are insurance policy holders with registered accounts, wherein the drivers may have opted in for the car care service or program.

The car care system may allow drivers to avoid the hassles of conventional car repairs by determining when vehicle maintenance should be performed (or is required) and by presenting drivers with an alternative form of transportation, such as a rental car, taxi service, or ridesharing service, for the duration of a vehicle repair. The car care system may receive maintenance data from a telematics device installed in a vehicle (e.g., vehicle on-board diagnostics). The maintenance data may comprise a status of the vehicle and may indicate one or more vehicle metrics associated with the vehicle's battery, brakes, engine, fuel economy, radiator, transmission, or the like. Based on the maintenance data, the car care system may determine whether or not a vehicle is in need of repair. If one or more of the vehicle metrics reflect abnormal operating conditions of the vehicle, the car care system may determine that the vehicle is in need of maintenance and determine a repair for the vehicle based on the one or more vehicle metrics. In some cases, a specific repair may indicate any number of issues with the vehicle. There may be several aspects of the vehicle that may need to be taken care of in order to ensure proper maintenance of the vehicle. For example, values of the one or more vehicle metrics may indicate that it is time for an oil change, a new air filter, a brake replacement, a new battery, a windshield wiper fluid refill, and/or other repair. The car care system may determine a repair needed by the vehicle and may inform one or more service providers of the repair. That is, the car care system may send a request for the repair of the vehicle to be performed by one or more service providers.

Furthermore, the car care system may receive a confirmation from at least one of the one or more service providers indicating that the vehicle will be picked up and transported to a repair shop. That is, the vehicle may be picked up from any location and brought to the repair shop where one or more service providers, such as technicians and/or mechanics, will perform the repair. The car care system may estimate a period of time needed by the one or more service providers to perform the repair. In some embodiments, the car care system may have access to previous repair records of vehicles that are insured and/or signed up for the car care service. These repair records may be stored in one or more databases that are accessible to the car care system. For example, the car care system may parse and analyze information in the one or more databases in order to identify similar types of repairs and assess previous repair times for different service providers and different vehicles. Based on the parsing and analysis of information, the car care system may be able to estimate how long the repair may take for the one or more service providers. The estimated period of time may also include time needed for the one or more service providers to pick up the vehicle from a specified location, transport the vehicle to the repair shop, and transport the vehicle from the repair shop back to the specified location or to another location (e.g., a home of the vehicle's owner) following the repair.

By estimating the period of time needed for repair, the car care system may be able to notify drivers of how long they will be without their vehicle. The car care system may also use the estimate to assign an alternative form of transportation to be provided to the driver associated with the vehicle during the estimated period of time for the repair. That is, the car care system may assign at least one of a rental car, taxi, or ridesharing service to be provided to the driver during the estimated period of time for the repair. In some embodiments, one or more service providers may pick up the vehicle for repair and drop off a rental car for the driver to use during the duration of the repair. This feature of the car care system may allow the driver to have access to transportation even when his or her vehicle is at the repair shop. Furthermore, drivers may receive one or more notifications regarding the repair being performed by the one or more service providers, the estimated period of time for the repair, and/or the assigned alternative form of transportation to be provided to the driver.

In some cases, a car care service may be referred to as an autonomous or automatic service because the driver may opt for repairs to be performed automatically by one or more service providers. That is, if the driver has already signed up for the car care service, the driver might not need to authorize each repair or maintenance before one or more service providers pick up and transport the driver's vehicle to a repair shop. For example, the car care system may send a notification to the driver to alert him or her that the vehicle has been or will be picked up and transported for repair. The driver may be at home, at work, or at any other location, and the one or more service providers may pick up the vehicle from the driver's parking garage, from a parking lot, or from in front of the driver's house or workplace where the vehicle is parked. The car care system may access the vehicle's location information (e.g., GPS coordinates indicating the geographical location of the vehicle) from a telematics device associated with the vehicle and provide the location information to the one or more service providers in order to facilitate with the pickup and repair of the vehicle. In other embodiments, a driver may be asked to confirm a repair before his or her vehicle is picked up and transported to a repair shop. That is, the car care system may send a request for repair to the driver that the driver may approve and/or confirm in order for one or more service providers to initiate the repair process. This confirmation may allow drivers to set a time (e.g., reschedule a repair for another day) for the vehicle to be picked up for repair so that the driver may be able to retrieve items from his or her vehicle or use his vehicle prior to the pickup and/or repair time. In an embodiment, this confirmation may be an optional feature of the car care service, and drivers may be able to adjust settings and/or parameters to receive notifications and/or provide confirmations before a vehicle is picked up for repair.

In some embodiments, a rental car may be provided automatically to drivers who sign up for the car care service. For example, during pickup of a driver's vehicle, one or more service providers may drop off a rental car in the same spot that the driver's vehicle was previously parked. The driver may be notified before and/or after the rental car is provided to replace the vehicle that has been transferred to the repair shop for maintenance. This feature of the car care service may allow a driver to have access to a vehicle at all times, whether the vehicle is his or her own vehicle or a rental car provided by the car care service. Drivers may ultimately be able to avoid going to repair shops and wasting time waiting for vehicle repairs to be performed. Accordingly, the car care system may save time for drivers by proactively monitoring vehicles for maintenance or repair-related issues, repairing vehicles in a seamless manner, estimating repair times, and assigning alternative transportation for drivers during estimated repair times.

In the following description of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

In one or more arrangements, teachings of the present disclosure may be implemented with a computing device. FIG. 1 illustrates a block diagram of an example car care device 100 that may be used in accordance with aspects of the present disclosure. The car care device 100 is a specialized computing device programmed and/or configured to perform and carry out aspects associated with requesting and providing car care service for drivers as described herein. The car care device 100 may have a car care manager 101 configured to perform methods and execute instructions as described herein. The car care manager 101 may be implemented with one or more specially configured processors and one or more storage units (e.g., databases, RAM, ROM, and other computer-readable media), one or more application specific integrated circuits (ASICs), and/or other hardware components. Throughout this disclosure, the car care manager 101 may refer to the software (e.g., a computer program or application) and/or hardware used to determine repairs for vehicles, estimate periods of time needed to perform specific repairs, and assign alternative transportation to drivers during the estimated periods of time. Specifically, the car care manager 101 may be a part of a car care system that assigns alternative transportation, such as rental cars, to drivers and facilitates the repair process for drivers and service providers. The one or more specially configured processors of the car care manager 101 may operate in addition to or in conjunction with another general processor 103 of the car care device 100. In some embodiments, the car care manager 101 may be a software module executed by one or more general processors 103. Both the car care manager 101 and the general processor 103 may be capable of controlling operations of the car care device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, gesture or other sensors, and/or stylus through which a user or a driver associated with the car care device 100 may provide input data. The I/O module 109 may also be configured to be connected to a display device 117, such as a monitor, television, touchscreen, and the like, and may include a graphics card. The display device 117 and input device 115 are shown as separate elements from the car care device 100, however, they may be within the same structure.

Using the input device 115, system administrators may update various aspects of the car care system, such as rules or information related to determining when a vehicle may need repair or should be repaired and what kind of repair may be needed or desired for proper operation of the vehicle. For example, system administrators may update values of one or more vehicle metrics associated with a vehicle's battery, brakes, engine, fuel economy, radiator, transmission, tires, or the like in order to specify normal operating conditions of vehicles. Based on these set values of the one or more vehicle metrics, the car care system may be able to determine when a vehicle may need repair. System administrators may also use the input device 115 to update rules or information related to estimating repair times and assigning transportation to drivers during the estimated repair times with the car care system. On some car care devices 100, the input device 115 may be operated by users (e.g., drivers associated with a vehicle) to interact with the car care system, including receiving or submitting information regarding vehicle statuses, confirming or rejecting requests to proceed with repair by one or more service providers, submitting requests to reschedule repairs, providing or updating preferences for car care service, sending contact information to service providers, updating account information, and the like, as described herein.

The memory 113 may be any computer readable medium for storing computer executable instructions (e.g., software). The instructions stored within memory 113 may enable the car care device 100 to perform various functions. For example, memory 113 may store software used by the car care device 100, such as an operating system 119 and application programs 121, and may include an associated database 123.

The network interface 111 allows the car care device 100 to connect to and communicate with a network 130. The network 130 may be any type of network, including a local area network (LAN) and/or a wide area network (WAN), such as the Internet. Through the network 130, the car care device 100 may communicate with one or more computing devices 140, such as laptops, notebooks, smartphones, personal computers, servers, and the like. The computing devices 140 may include at least some of the same components as car care device 100. In some embodiments the car care device 100 may be connected to the computing devices 140 to form a "cloud" computing environment.

The network interface 111 may connect to the network 130 via communication lines, such as coaxial cable, fiber optic cable, and the like or wirelessly using a cellular backhaul or a wireless standard, such as IEEE 802.11, IEEE 802.15, IEEE 802.16, and the like. In some embodiments, the network interface may include a modem. Further, the network interface 111 may use various protocols, including TCP/IP, Ethernet, File Transfer Protocol (FTP), Hypertext Transfer Protocol (HTTP), and the like, to communicate with other computing devices 140.

FIG. 1 is an example embodiment of a car care device 100. In other embodiments, the car care device 100 may include fewer or more elements. For example, the car care device 100 may use the general processor(s) 103 to perform functions of the car care manager 101, and thus, might not include a separate processor or hardware for the car care manager 101. Additionally, or alternatively, the car care device 100 may be a mobile device (e.g., a smartphone, tablet, and the like) specially configured to perform or carry out aspects of car care described herein, and thus, may also include various other components, such as a battery, speaker, and/or antennas (not shown). Also, the car care device 100 may be a telematics device and/or a vehicle computing device (either installed by a vehicle manufacturer or as an aftermarket part) having vehicle compatible elements, such as a port for an on-board diagnostic connector or ports for other vehicle sensors (e.g., tire pressure sensors, engine temperature sensors, and the like). For example, the car care device 100 may be a vehicle's computer or a device plugged into the vehicle's computer for use in vehicle telematics.

Figure 2:
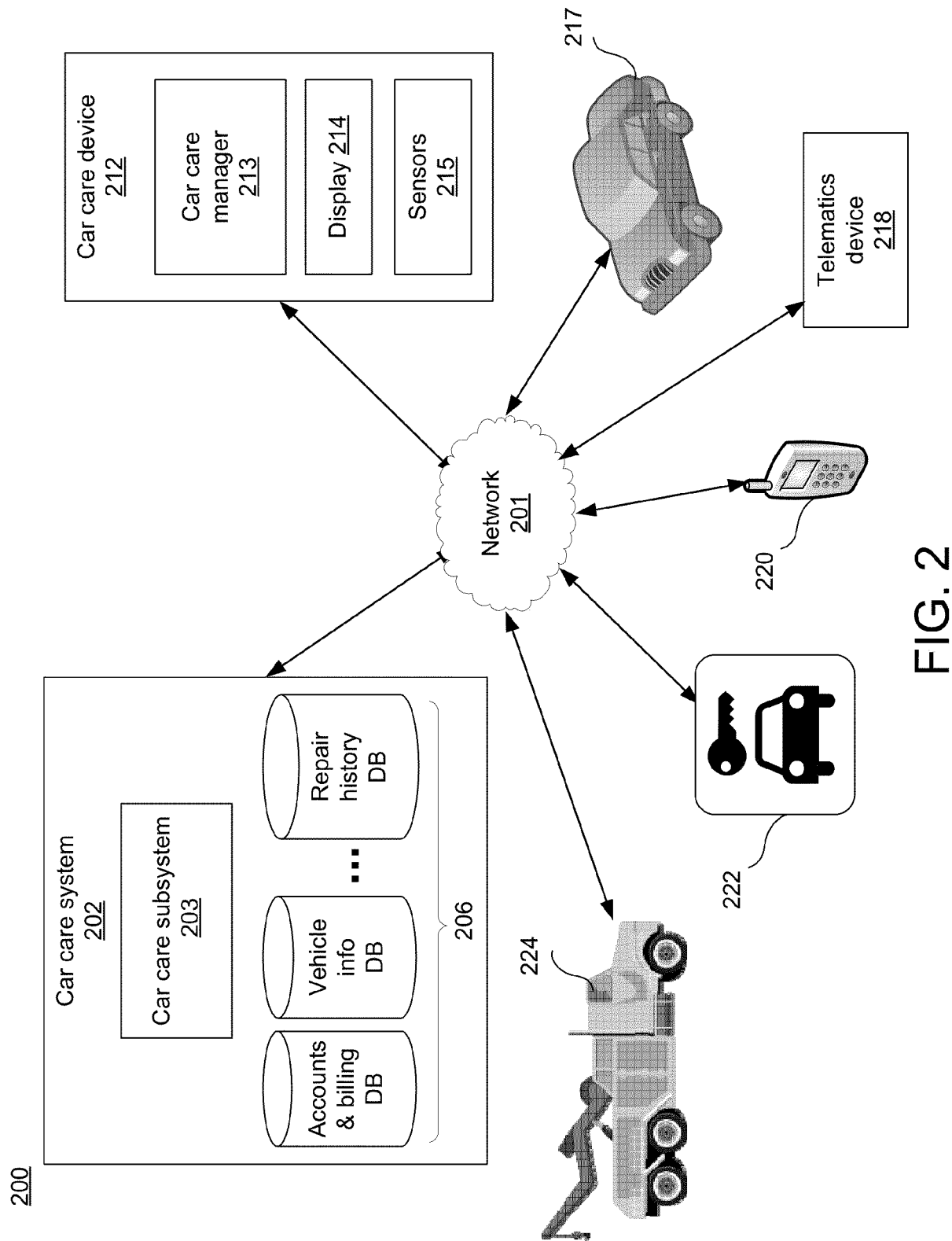
FIG. 2 depicts an example network environment in which various aspects of the present disclosure may be implemented in accordance with one or more example embodiments.

The computerized methods for providing car care features and assigning alternative forms of transportation to drivers for estimated periods of repair time as disclosed herein may be implemented on one or more car care devices 100 used in various network environments. FIG. 2 illustrates an example network environment 200 for implementing methods in accordance with aspects of the present disclosure.

As shown in FIG. 2, the network environment 200 may include a network 201 configured to connect a car care system 202, car care device 212, vehicle 217, telematics device 218, mobile device 220, alternative transportation services 222, and service providers 224. The car care device 212 may be the same as or at least similar to the car care device 100 described above with reference to FIG. 1. Collectively, these specialized computing devices may form at least a part of an autonomous car repair system. Although only one of each of the components 212, 217, 218, 220, 222, and 224 are shown in FIG. 2, it is understood that there may be any number of components 212, 217, 218, 220, 222, and 224 in the network environment 200.

The network 201 may be any type of network, like the network 130 described above, and may use one or more communication protocols (e.g., protocols for the Internet (IP), Bluetooth, cellular communications, satellite communications, and the like.) to connect computing devices and servers within the network environment 200 so they may send and receive communications between each other. In particular, the network 201 may include a cellular network and its components, such as cell towers. Accordingly, for example, a mobile device 220 (e.g., a smartphone) or a car care device 212 of a driver associated with vehicle 217 may communicate, via a cellular backhaul of the network 201, with a car care system 202 to confirm or reschedule a request for repair of the vehicle as part of the car care service. In another example, the mobile device 220 or the car care device 212 of the driver of the vehicle 217 may communicate, via the cellular backhaul of the network 201, with the car care system 202 to request information regarding a repair or update account information and/or preferences for the car care service for the vehicle 217. And in the opposite direction, the car care system 202 may communicate, via the cellular backhaul of the network 201, with the mobile device 220 or the car care device 212 to notify the user (e.g., the driver of vehicle 217) of the mobile device 220 or car care device 212 of a repair being performed by one or more service providers 224, an estimated period of time for the repair, and/or an assigned alternative form of transportation to be provided to the driver, such as a rental car 222. In another embodiment, the mobile device 220 and/or car care device 212 may communicate back and forth with the car care system 202 over the Internet, such as through a web portal. As shown in FIG. 2, it should be understood that the mobile device 220 or car care device 212 may connect to the network even if it is removed from the vehicle 217.

In an embodiment, there may be multiple vehicles 217 that are covered by an insurance policy of one individual. Although FIG. 2 illustrates only one vehicle 217, the car care system may be configured to communicate with multiple vehicles 217 simultaneously (e.g., at or around the same time), and the multiple vehicles 217 may be associated with multiple individuals. The car care system 202 may receive maintenance data for multiple vehicles simultaneously, determine repairs for the multiple vehicles simultaneously, send repair requests to one or more service providers 224 simultaneously, estimate periods of repair time for multiple vehicles simultaneously, assign alternative forms of transportation for multiple drivers simultaneously, and notify the multiple drivers of repairs, repair times, and alternative transportation assignments simultaneously. Also, although FIG. 2 depicts the vehicle 217 as a car, the vehicle 217 may be any type of vehicle, including a motorcycle, bicycle, scooter, drone (or other automated device), truck, bus, boat, plane, helicopter, and the like.

In an embodiment, there may be a driver associated with the vehicle 217. The driver may be associated with the vehicle 217 if the driver is an owner of the vehicle 217 and/or has access and/or permission to drive or operate the vehicle

217. Additionally or alternatively, a driver may be associated with the vehicle 217 if the driver is identified on an insurance policy that insures the vehicle 217. A driver of the vehicle 217 may also be associated with and operate a car care device 212. In an embodiment, the car care device 212 may be a specialized mobile device (e.g., mobile phone), a tablet, laptop, personal computer, and the like configured to perform or carry out aspects associated with autonomous car repair described herein. For example, the car care device 212 may be the same as the mobile device 220 depicted in FIG. 2. The car care device 212 may belong to a driver, individual, or customer of an insurance company who is enrolled in a car care service. Although only one car care device 212 is illustrated in FIG. 2, there may be any number of car care devices 212, wherein each car care device 212 is associated with at least one driver. The car care device 212 may further comprise a car care manager 213, a display 214, and sensors 215. In the case of a car care device 212 that is installed in or connected to a vehicle 217, the individual is considered to operate that car care device 212 by performing the installation or connection of that device in or at the vehicle 217.

The car care device 212 may be configured to execute the car care manager 213 that presents a user interface (e.g., a graphical user interface for a website, application, software program, and the like) on the display 214. The display 214 may comprise a monitor, television, touchscreen, and the like. The user interface of the car care manager 213 may allow drivers to send and/or receive maintenance data regarding a vehicle status, send and/or receive notifications and confirmations for repair requests, and update account information or preferences for the autonomous car repair service provided by the car care system 202.

The car care manager 213 may be a self-sufficient program or may be a module of another program, such as a program used to collect and/or evaluate driver information representing actions of a vehicle 217, driving behavior of a driver associated with a vehicle 217, and/or status updates of a vehicle 217. The car care manager 213 may have access to driving behavior data that is collected by the sensors 215 of the car care device 212. The car care manager 213 may be configured in a similar manner as the car care manager 101 or configured to perform similar functions as those performed by the car care manager 101. The sensors 215 may comprise various sensors and/or modules that detect driving behaviors, environmental information, and/or other risk-related factors of a driver of a vehicle 217. For example, the sensors 215 may comprise an accelerometer, speedometer, GPS, gyroscope, and the like. In an embodiment, the sensors 215 may detect risk-related factors that may result in a roadside incident involving the vehicle 217. The car care manager 213 may also have access to maintenance data that is collected by the sensors 215 of the car care device 212. For example, the sensors 215 may comprise car engine sensors, oxygen sensors, temperature sensors, water sensors, coolant sensors, position sensors, oil pressure gauges, and the like. Each of these sensors 215 may be used to monitor various metrics of the vehicle 217 to ensure that the vehicle 217 is properly functioning under safe operating conditions. In an embodiment, the sensors 215 may detect maintenance-related issues in the vehicle 217.

In an embodiment, the car care manager 213 may be downloaded or otherwise installed onto the car care device 212 using known methods. Different devices may install different versions of the car care manager 213 depending on their platform. For example, a car care device 212 (e.g., a smartphone) running the iOS™ operating system may download a different version of the car care manager 213 than a car care device 212 running the ANDROID™ operating system.

A driver may launch the car care manager 213 by, for example, operating buttons or a touchscreen on the car care device 212. Additionally, or alternatively, the car care device 212 may be configured to execute a web browser (e.g., an application for accessing and navigating the Internet) to access a web page providing an interface for the car care system. In some embodiments, the car care device 212 may also be configured to collect information, such as maintenance data. For example, the car care manager 213 or another program installed on the car care device 212 may instruct the car care device 212 to collect maintenance data using the various sensors 215 (e.g., accelerometer, speedometer, car engine sensors, oxygen sensors, temperature sensors, water sensors, coolant sensors, position sensors, oil pressure gauges, and the like). Maintenance data may comprise data that is indicative of the values of one or more vehicle metrics associated with at least one of the vehicle's battery, brakes, engine, fuel economy, radiator, transmission, tires, or the like. Maintenance data may also include vehicle telematics data or any other data related to events occurring during a vehicle's trip (e.g., an impact to a part of the vehicle, a deployed airbag, and the like).

The car care manager 213 or another program installed on the car care device 212 may collect maintenance data over a predetermined period of time and determine a status of the vehicle 217 based on the collected maintenance data. For example, the maintenance data may reflect levels that show that a vehicle's engine oil may be low or that it is time to change the vehicle's engine oil and/or oil filter (e.g., after reaching a certain number of miles as indicated by a vehicle's odometer). Other examples of vehicle statuses indicated by maintenance data include low air pressure values indicating a flat tire, low transmission fluid levels indicating a leak, low power steering fluid levels indicating a leak, overheating or low coolant levels indicating that it is time for a coolant change, and the like. The car care manager 213 or another program may determine a repair for the vehicle based on the status of the vehicle 217 as indicated by the collected maintenance data. Whether a repair should be performed and which type of repair should be performed may depend on the vehicle. Different vehicles (e.g., vehicles of different makes, models, and years) may have different parts and maintenance standards. The car care manager 213 or another program may also collect location information, such as GPS coordinates indicating the geographical location of the car care device 212 and/or vehicle 217.

In some embodiments, the car care manager 213 may use the collected maintenance data and the determined repair to estimate a period of time needed by one or more service providers to perform a repair. Accordingly, the car care manager 213 may then assign an alternative form of transportation to be provided to the driver of the vehicle 217 during the estimated period of time of the repair. The driver associated with the vehicle 217 and associated with the car care device 212 may employ the car care manager 213 to send, receive, and/or access at least one of car care repair requests/notifications, car care repair information, service provider information, rental car service information, contact information, account information, and settings/preferences related to the vehicle 217.

Additionally, FIG. 2 also illustrates a telematics device 218 connected to the network 201. In an embodiment, the telematics device 218 may be referred to as a vehicle computing device that is associated with the vehicle 217 and the mobile device 220. In some embodiments, the mobile device 220 and telematics device 218 may communicate with one another (e.g., via Bluetooth). The mobile device 220 may be any mobile device (e.g., a smartphone, tablet, and the like) that is associated with a driver or passenger of the vehicle 217. In particular, the mobile device 220 may belong to a driver of the vehicle 217, wherein the driver is a customer of an insurance company and enrolled in a service that allows the driver to participate in car care services. The mobile device 220 may be configured similarly to the car care device 212 and may interface with the telematics device 218.

The telematics device 218 may be configured to execute a car care manager that presents a user interface for a customer to provide inputs to and receive outputs from the car care system 202. The car care manager 213 may be downloaded or otherwise installed onto the telematics device 218 using known methods. Once installed onto the telematics device 218, a driver may launch the car care manager 213 by, for example, operating buttons or a touchscreen on the dashboard of the vehicle 217. Additionally, or alternatively, the telematics 218 may be configured to execute a web browser to access a web page providing an interface for the car care system 202.

In some embodiments, the telematics device 218 may be a device that is plugged into the vehicle's 217 on-board diagnostic (OBD) system (e.g., plugged in through an OBD II connector) or otherwise installed in the vehicle 217 in order to collect maintenance data using, e.g., its accelerometer, GPS, gyroscope, or any other sensor (either in the telematics device 218 or the vehicle 217). As mentioned above, this maintenance data may include data indicative of one or more vehicle metrics, as well as vehicle telematics data or any other data related to events occurring during a vehicle's trip (e.g., an impact to a part of the vehicle 217, a deployed airbag, or other event triggered by a sensor 215 of the vehicle 217). The vehicle 217 may have a GPS installed therein, and therefore, the telematics device 218 may also collect GPS coordinates. Alternatively, the telematics device 218 may include its own GPS receiver.

Further, the telematics device 218 may include multiple devices. For example, the telematics device 218 may include the vehicle's OBD system and other computers of the vehicle 217. The telematics device 218 may be configured to interface with one or more vehicle sensors (e.g., fuel gauge, tire pressure sensors, engine temperature sensors, and the like). The telematics device 218 may also interface with the mobile device 220 via a wired connection (e.g., USB, OBD II connector, and the like) or a wireless connection (e.g., Bluetooth). In some embodiments, there might not be a telematics device 218 installed in the vehicle 217 that is configurable to interface with the car care system 202, or the telematics device 218 might not be able to communicate with the mobile device 220. Still, in some cases, the telematics device 218 might be configured so that it only communicates with the mobile device 220 within the same vehicle 217.

In an embodiment, both a telematics device 218 and a mobile device 220 (or a car care device 212) may be employed, whereas in another embodiment, only one of these devices may be used with the car care system to collect maintenance data. For example, a driver associated with the vehicle 217 may choose whether he or she wishes to use his or her mobile phone to capture maintenance data or whether he or she wishes to have a device plugged into the vehicle 217 to collect maintenance data.

FIG. 2 also illustrates an alternative transportation service 222 and a service provider 224. In some embodiments, there may be any number of alternative transportation services 222 and service providers 224 in the network environment 200. The alternative transportation service 222 may represent any alternative forms of transportation services that the car care system 202 may assign to a driver of the vehicle 217 during an estimated period of time for repair of the vehicle 217. For example, alternative forms of transportation may include one or more of a rental car, taxi, ridesharing service, and the like. A driver may specify his or her preferences for an alternative form of transportation by using the car care manager 213. In some embodiments, the alternative transportation services 222 may be partnered with an insurance company to offer transportation services to insured customers. In some cases, providers of the alternative transportation services 222 (e.g., rental car company employees, taxi drivers, ridesharing service drivers) may access the car care system 202 through a computing device, such as a personal computer, laptop, mobile device, tablet, and the like (e.g., car care device 100). The alternative transportation service providers 222 may use a corresponding computing device to communicate with drivers and/or insurance agents through the car care system 202.

The service provider 224 may represent one or more service providers 224 that are partnered with an insurance company offering car care services. For example, the insurance company may work with particular service providers 224 (e.g., businesses, companies, entities, and the like) that provide repair services and routine vehicle maintenance for insured customers (e.g., drivers). In some embodiments, a service provider 224 may access the car care system 202 through a computing device, such as a personal computer, laptop, mobile device, tablet, and the like (e.g., car care device 100). Each service provider 224 may use a corresponding computing device to communicate with drivers and/or insurance agents through the car care system 202. That is, each service provider 224 may use a corresponding computing device to receive requests for repair and/or send confirmation messages informing drivers that they will perform requested repairs through the car care system 202.

As an example, one or more service providers 224 may pick up a driver's vehicle 217 and transport the vehicle 217 to a repair shop. In some cases, the vehicle 217 may need a minor repair or a routine maintenance, such as an oil change or a brake replacement, in which the vehicle 217 may still be in a working condition (e.g., the vehicle may still be driveable). Nonetheless, the one or more service providers 224 may pick up the working vehicle, and an alternative transportation service 222 may be provided to the driver in order to save time for the driver.

Car care services may be offered to customers of an insurance company as an optional service. For example, drivers may sign up or opt for a car care service and may pay fess additional to their insurance premium fees. In another embodiment, the car care service may be an additional feature in a customer's insurance plan. In some embodiments, the insurance company may compensate the one or more service providers 224 and the one or more alternative transportation services 222 for providing repair services and transportation services to drivers. In some cases, the insurance company may have one or more service-level agreements with various service providers and/or rental car companies to provide requested services to drivers.

In some cases, customers may sign up for different levels of car care service. In some embodiments, a driver may authorize automatic repairs to be performed on his or her vehicle. For example, the vehicle may be repaired without receiving the driver's confirmation or authorization each time maintenance or repair is performed. In another example, the driver may sign up to receive autonomous repairs in which repairs are performed automatically with the driver being notified of each repair. The driver may also sign up for the car care service but opt for service requests to be sent to the driver in order for the driver to confirm the service before repairs are performed by the one or more service providers 224.

In some embodiments, the car care system 202 may estimate a period of time needed by the one or more service providers 224 to perform a repair on the driver's vehicle 217 and notify the driver of the estimated period of time. The driver may then decide whether to confirm or approve of the repair being performed on the same day, or the driver may reschedule the repair to be performed on another day. For example, the driver may desire to use his or her vehicle 217 for a couple of days. Thus, the driver may set a specific time for the repair to be performed at a later date by rejecting a request for repair using his or her mobile device (e.g., via the mobile device 220 or via the car care manager 213 on the driver's car care device 212). In some cases, the driver may disagree with the proposed repair and may suggest his or her own recommendation for repair using the car care device 212.

FIG. 2 also illustrates example subsystems within the network environment 200. That is the car care system 202 may comprise a car care subsystem 203 and a plurality of databases 206. The car care subsystem 203 may include one or more application servers, computing devices, and other equipment (e.g., conference bridge equipment) used by company (e.g., insurance company) personnel to implement and provide the car care services described herein. For example, the car care subsystem 203 may include a car care assignment module that is configured with programmed instructions to determine a repair for a vehicle 217 based on collected maintenance data, send a request to one or more service providers 224 for the repair to be performed, estimate a period of time needed by the one or more service providers 224 to perform a repair on the driver's vehicle 217, assign an alternative transportation service 222 to be provided to the driver of the vehicle 217 during the estimated period of time for the repair, and notify the driver of the repair details (e.g., including the estimated repair time) and alternative transportation assignment.

For example, the car care assignment module may estimate a period of time for a repair based on previous repair records of vehicles that are insured and/or part of the car care program. The car care assignment module may access these previous repair records that may be stored in one or more databases (such as databases 206). The car care assignment module may be able to estimate a period of time for a repair based on parsing the repair records to assess previous repair times for a specific service provider and for similar types of repair. Based on the estimated repair time, the car care assignment module may assign an alternative form of transportation to be provided to the driver during the vehicle repair. The car care assignment module may associate an estimated repair time and an alternative transportation assignment with a car care account by identifying an account number or another unique identifier for the account. The estimated repair time and alternative transportation assignment may be stored as one or more records in a database (e.g., database 206) of the car care system 202, in which the one or more records may be associated with driver or customer records stored in the database. For example, the one or more records may identify a unique identification number for a driver or customer. In another example, the one or more records may include a field for the estimated repair time and a field for the assigned transportation for the driver. The car care assignment module may update the alternative transportation assignment and/or repair time by inserting one or more identifiers in the fields of the one or more records.

The car care assignment module may also be configured with programmed instructions to determine a repair for a vehicle 217 based on collected maintenance data. For example, the car care assignment module may update or store information regarding maintenance, vehicle status, and/or repairs associated with a car care account (e.g., in a database 206). The car care assignment module may associate maintenance data and repair information with a car care account by identifying an account number or another unique identifier for the account. The maintenance data and repair information be associated with driver or customer records stored in the database 206.

The car care subsystem 203 may include functionality that may be distributed among a plurality of computing devices. For example, the car care subsystem 203 may comprise further subsystems, including client-side subsystems and server-side subsystems. The client-side subsystem may interface with the car care device 212, telematics device 218, and/or mobile device 220, whereas the server-side subsystem may interface with application servers and computing devices which handle a variety of tasks related to the estimation of repair times, assignment of alternative forms of transportation, and overall management of car care services.

The subsystems, application servers, and computing devices of the car care subsystem 203 may also have access to the plurality of databases 206. In an embodiment, the plurality of databases 206 may be incorporated into the car care subsystem 203 or may be separate components in the car care subsystem 203. As an example, the plurality of databases 206 may comprise an accounts and billing database, a vehicle information database, a repair history database, and other databases. A database 206 may comprise information regarding at least one of maintenance data, vehicle information, repairs, alternative transportation assignments, and account and billing information. For example, a database 206 may store a record of estimated repair times (for previous repairs and/or for different service providers), alternative transportation services to which a driver has been assigned, and the like. The data stored in the plurality of databases 206 may be collected and compiled by the car care device 212, the telematics device 218, the car care subsystem 203, or by servers and subsystems within the car care subsystem 203.

Accordingly, the car care system may save time for drivers by proactively monitoring vehicles for maintenance or repair-related issues, repairing vehicles in a seamless manner, estimating repair times, assigning alternative transportation for drivers during estimated repair times, and organizing vehicle pickups and alternative transportation (e.g., rental car deliveries) for multiple drivers.

Figure 3:
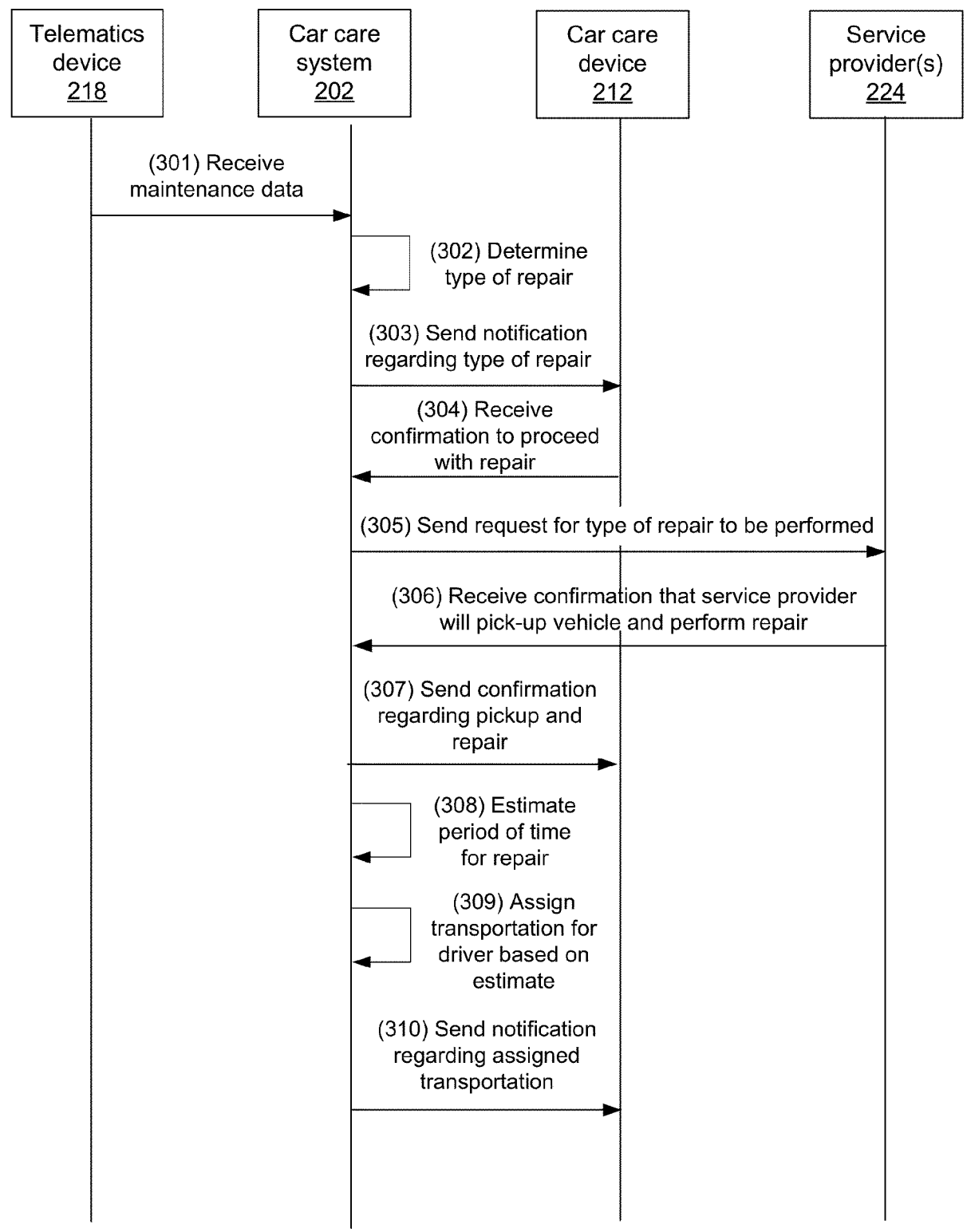
FIG. 3 depicts an illustrative event sequence diagram for determining repair for vehicles, estimating repair times, and assigning alternative transportation to drivers in accordance with one or more example embodiments.

FIG. 3 illustrates a sequence diagram of an example method in accordance with aspects of the present disclosure. The sequence diagram of FIG. 3 shows a sequence of steps for exchanging communications between the car care system 202, car care device 212, telematics device 218, and the one or more service providers 224. The sequence of steps in the sequence diagram, as illustrated in FIG. 3, may begin at step 301 in which the car care system 202 may receive maintenance data regarding a vehicle status. For example, the car care system 202 may receive maintenance data regarding the vehicle 217 from the telematics device 218. The maintenance data may indicate one or more vehicle metrics associated with at least one of the vehicle's battery, brakes, engine, fuel economy, radiator, transmission, or tires. In some embodiments, the telematics device 218 and the car care device 212 may be the same device. That is, the car care device 212 may collect maintenance data and provide the maintenance data to the car care system 202 in step 301.

At step 302, the car care system 202 may determine a repair for the vehicle based on the maintenance data. That is, the maintenance data may indicate a status of the vehicle 217, and the car care system 202 may determine a corresponding repair based on this status. Repairs may include conventional maintenance repairs or repairs associated with roadside incidents. For example, repairs may include oil changes, air filter replacements, brake replacements, battery replacements, windshield wiper fluid refills, and more. At step 303, the car care system 202 may send a notification regarding the specific repair needed to the car care device 212. The notification sent to the car care device 212 may include a request for confirmation from the driver associated with the vehicle 217 in order to proceed with the repair. At step 304, the car care system 202 may receive a confirmation from the car care device 212 to proceed with the repair. At step 305, the car care system 202 may send a request for the repair to be performed to one or more service providers 224. For example, there may be several service providers or technicians that receive the request to perform repair on the vehicle 217. At step 306, the car care system 202 may receive a confirmation from at least one of the service providers 224 regarding the repair. For example, the car care system 202 may receive a confirmation indicating that at least one of the service providers 224 will pick up and transport the vehicle 217 for repair at a repair shop.

At step 307, the car care system 202 may send a confirmation to the car care device 212 regarding a vehicle pickup and repair. For example, the car care system 202 may notify the driver associated with the car care device 212 that the vehicle 217 will be picked up and transported to a repair shop by at least one of the service providers 224. At step 308, the car care system 202 may estimate a period of time needed by the one or more service providers 224 to perform the repair. Based on this estimate, at step 309, the car care system 202 may assign an alternative form of transportation to be provided to the driver during the estimated period of time for repair of the vehicle 217. That is, the car care system 202 may assign an alternative transportation service 222 to the driver for use while his or her vehicle 217 is being repaired. At least one of the service providers 224 may pick up the vehicle 217 and replace the vehicle 217 with the assigned alternative transportation service 222 (e.g., a rental car, a taxi, or a ridesharing car). At step 310, the car care system 202 may send at least one notification to the car care device 212. For example, the car care system 202 may notify the driver of the repair being performed by the one or more service providers 224, the estimated period of time for the repair, and/or the assigned alternative transportation service 222 that will be (or is currently being) provided to the driver.

Figure 4:
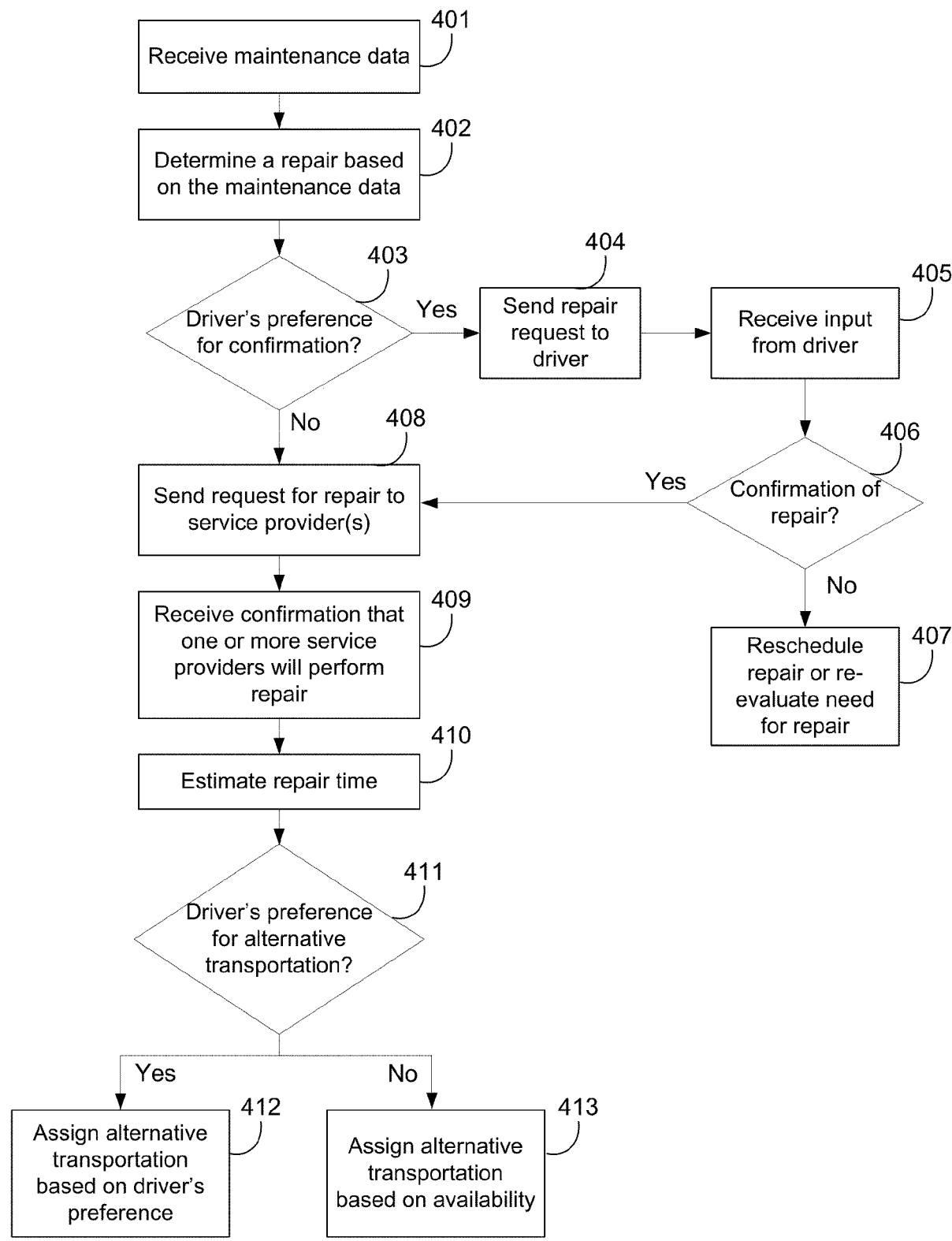
FIG. 4 depicts a flow diagram of example method steps for providing car care services to drivers in accordance with one or more example embodiments.

FIG. 4 illustrates a flow diagram of an example method in accordance with aspects of the present disclosure. In particular, FIG. 4 illustrates example method steps for determining repairs, estimating repair times, assigning alternative forms of transportation to drivers. The steps of FIG. 4 may be performed by subsystems, application servers, and computing devices of the car care system 202 (e.g., car care subsystem 203). One or more of the steps of FIG. 4 may be performed by executing a car care program (e.g., a car care mobile application) and/or by operating a particularly configured computing device of the car care system 202. As a result of the method of FIG. 4, a driver, at car care device 212 and associated with vehicle 217, may be assigned an alternative form of transportation to be provided during repair of his or her vehicle 217.

The method of FIG. 4 may begin with a step of 401 of receiving maintenance data. For example, the car care system 202 may receive maintenance data regarding a status of the vehicle 217. In some embodiments, the maintenance data of the vehicle 217 may be collected over a period of time by the telematics device 218, car care device 212, or mobile device 220. At step 402, the car care system may determine a repair for the vehicle based on the maintenance data. At step 403, the car care system may determine if the driver has set a preference regarding repair confirmations. For example, the car care system 202 may determine whether or not the driver has signed up for an automatic repair service in which car care is provided to the driver automatically without confirmation. In other words, the driver may set up his or her car care service account to receive confirmation messages before a repair is performed. If the driver has set his preferences not to receive a confirmation message and proceed to autonomous car repair services (e.g., without driver authorization), then the method in this example proceeds to step 408. If the driver has set his preferences to receive a confirmation message, then the method in this example proceeds to step 404.

At step 404, the car care system 202 may send a repair request to the driver. The repair request may include a request for a confirmation from the driver in order to authorize repair. At step 405, the car care system may receive an input from the driver, such as from the car care manager 213 on the driver's car care device 212. For example, the driver may confirm, approve, reject, or reschedule of the repair request in order for the repair to be performed by the one or more service providers. At step 406, the car care system 202 may determine if the driver has confirmed the request for repair. If the driver has not confirmed the repair, then the method in this example proceeds to step 407. At step 407, the car care system 202 may reschedule the repair or re-evaluate the need for the repair of the vehicle 217 based on the driver's input. For example, the driver may reschedule the repair for a later date or the driver may provide additional information regarding symptoms that the vehicle may be exhibiting. For example, the symptoms of the vehicle might not match with the repair that the car care system 202 recommended at step 402. Thus, the repair may need to be reevaluated based on the additional information provided by the driver. If the driver has confirmed the repair request, then the method in this example proceeds to step 408.

At step 408, the car care system 202 may send a request for repair to one or more service providers 224. At step 409, the car care system 202 may receive a confirmation that at least one of the service providers 224 will perform the repair. The confirmation may indicate that at least one of the service providers 224 will pick up the vehicle 217 and transport the vehicle 217 to a facility for repair (e.g., repair shop, auto shop, etc.). At step 410, the car care system 202 may estimate a period of time needed by the one or more service providers to perform the repair. At step 411, the car care system 202 may determine if the driver has set any preferences for an alternative form of transportation. For example, the driver may prefer to use a specific rental car company or prefer to have a taxi service or a ridesharing service to use during a vehicle repair. Thus, if the driver has identified an alternative transportation preference, then the method may proceed to step 412, in which the car care system 202 may assign an alternative transportation service 222 to the driver based on the driver's preference. If the driver has not identified an alternative transportation preference, then the method may proceed to step 413, in which the car care system 202 may assign an alternative transportation service 222 to the driver based on availability. For example, the car care system 202 may assign at least one of a rental car, a taxi service, or a ridesharing service based on whichever service is readily available to be assigned to the driver for the estimated period of time for the repair. Ultimately, the driver may have access to transportation for the duration of a vehicle repair in order that the driver has no inconveniences for traveling.

FIGS. 5-8 each depict an illustrative diagram of example user interfaces of a car care application 502 operating on a car care device 500 in accordance with aspects of the present disclosure. The example user interfaces may be presented on a display of a computing device, such as display 214 of car care device 212. A driver operating a vehicle, such as vehicle 217, may access a car care application 502 using a car care device 500 (e.g., at least one of the car care device 212, telematics device 218, or mobile device 220). Specifically, FIGS. 5A and 5B illustrate example user interfaces of utilizing a car care application 502 to view and manage car care services. The user interface in FIG. 5A depicts a menu for the car care application 502 that may be displayed on the car care device 500. The driver operating the car care 500 may tap on a button or icon on the user interface to navigate to different screens in the car care application 502. For example, the driver may select one or more of the following options: "Car Care Notifications", "Repair Information", "Service Providers", "Rental Car Services", "View Account Information", and "Settings & Preferences."

Figure 5B:
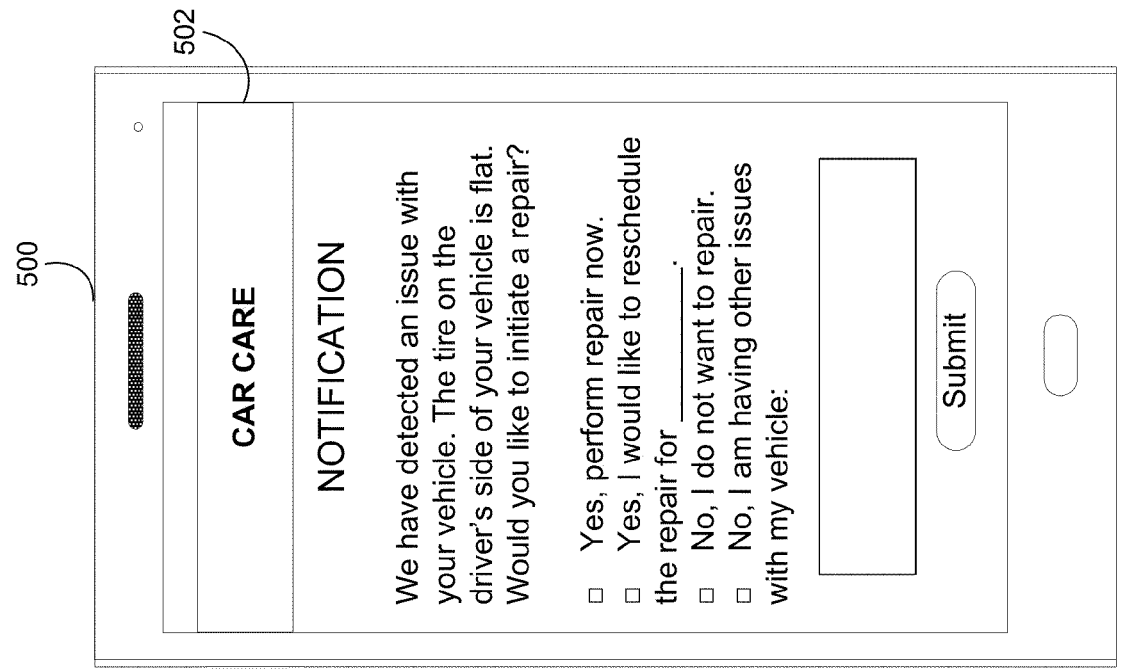
FIGS. 5A and 5B depict an illustrative diagram of example user interfaces of a car care application in accordance with one or more example embodiments.
Figure 5A:
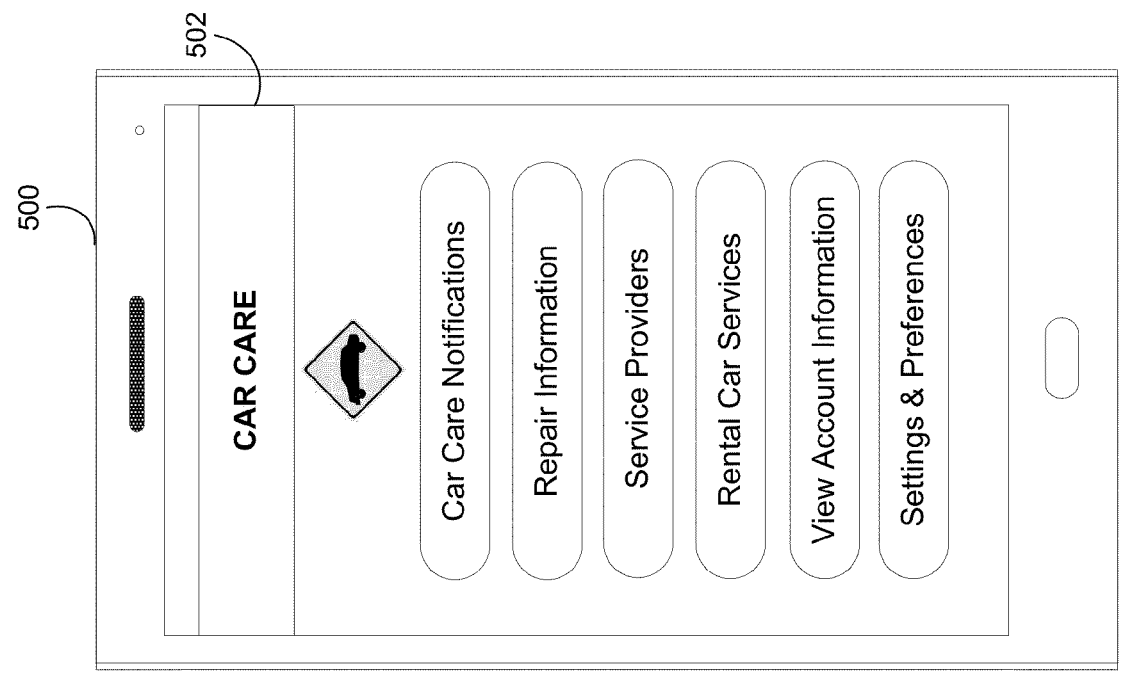

The user interface in FIG. 5B depicts what may be displayed on the car care device 500 after the driver receives a notification regarding car care services. For example, the driver may select the "Car Care Notifications" option shown in the FIG. 5A user interface. In this screen, the driver may select one or more options in response to a notification regarding car care services. The "Car Care Notification" may describe a detected issue with a vehicle, such as an issue related to a roadside incident (e.g., a car accident) or routine maintenance for the vehicle. For example, the car care application 502 may inform the driver of a maintenance issue (e.g., such as a flat tire) regarding his or her vehicle, and may request a response from the driver on how to proceed. In some cases, the car care application 502 may provide a recommended course of action (e.g., a recommended repair) to the driver regarding the maintenance issue. For example, if the driver's vehicle has a flat tire, the car care application 502 may inform the driver that the recommended repair is a tire change provided by the car care service. The driver may respond to the notification by confirming, rejecting, and/or rescheduling the repair for a specific time. In some cases, the driver may use the car care application 502 to provide additional information regarding issues that he or she is experiencing with his vehicle. For example, the driver may be experiencing issues with braking and may be able to provide details through the car care application 502 regarding the specific symptoms of the vehicle that the driver is experiencing while driving. In other cases, the driver may submit his or her own recommendation for repair through the car care application 502. For example, the car care application 502 may notify the driver that it is time for an oil change and filter replacement. However, the driver may desire to simply change the oil without replacing the filter because he or she changed the filter recently. The driver may submit this information to the car care application 502 in order to modify the repair request.

Figure 6B:
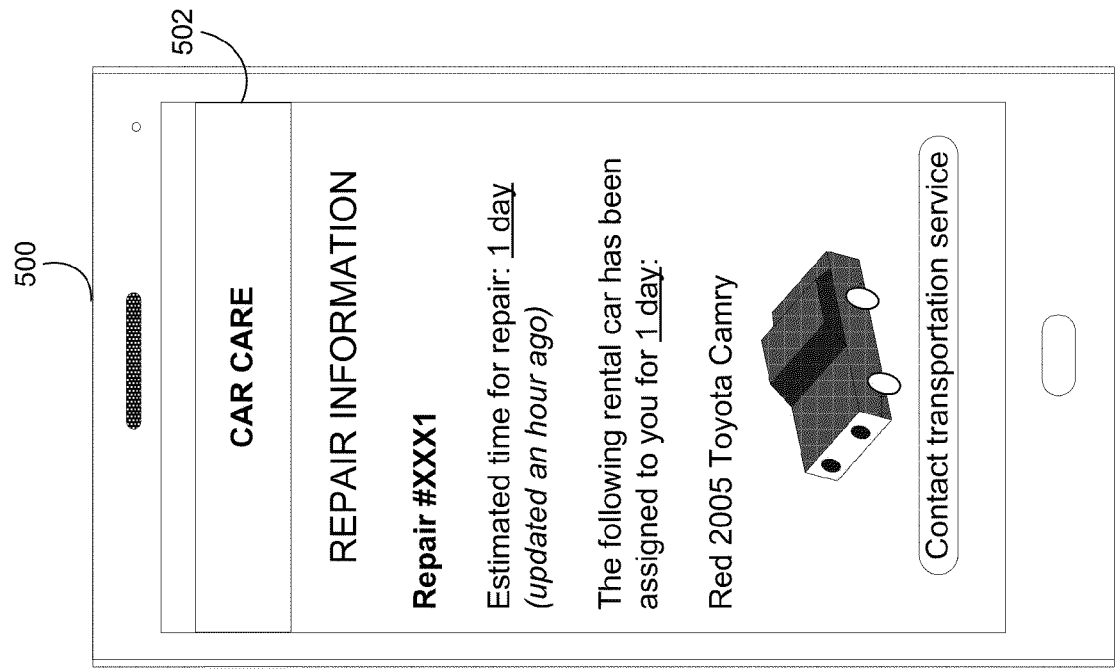
FIGS. 6A and 6B depict an illustrative diagram of example user interfaces of a car care application in accordance with one or more example embodiments.
Figure 6A:
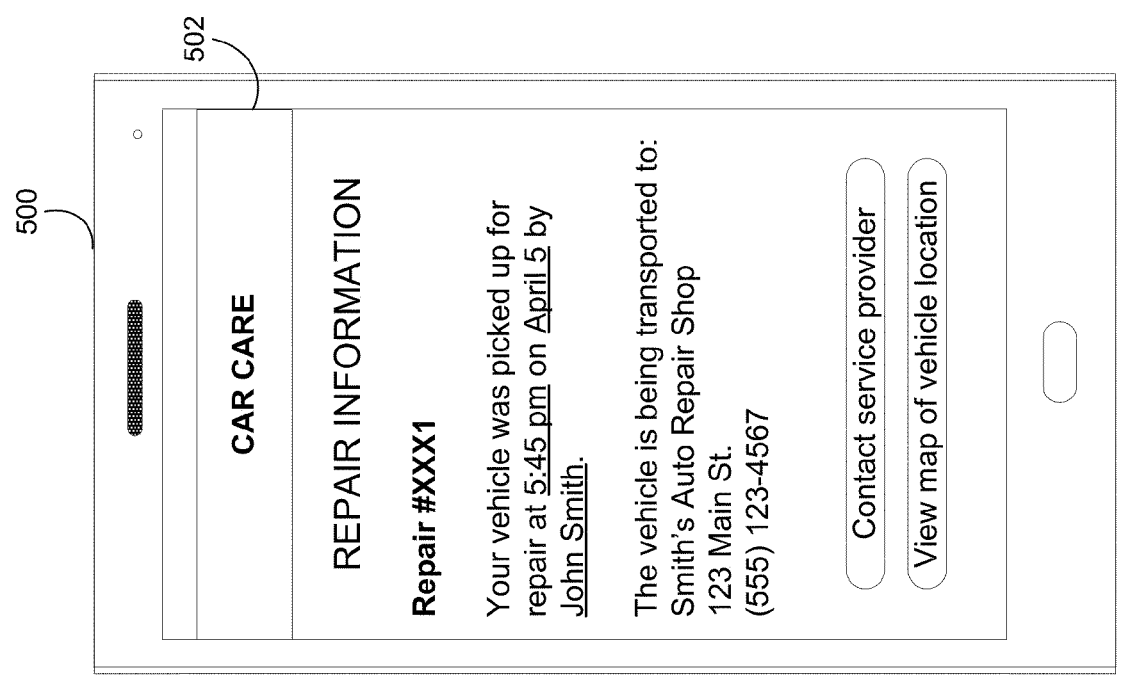

FIGS. 6A and 6B illustrate example user interfaces of utilizing a car care application to view details regarding car care repairs. A driver may be able to navigate to the user interfaces shown in FIGS. 6A and 6B by selecting the "Repair Information" option shown in the FIG. 5A user interface. The user interface in FIG. 6A may depict repair information regarding any number of maintenance-related issues, roadside incidents, and corresponding repairs initiated for a vehicle. For example, the FIG. 6A user interface may show example information for a specific repair, including the time and date a vehicle was picked up, the one or more service providers (e.g., a service technician, a mechanic, etc.) who picked up the vehicle, where the vehicle is being repaired at or where the vehicle will be repaired at, time remaining before the repair is complete, time the vehicle is expected to be returned, where the vehicle will be returned, and other information. Additional information shown on this "Repair Information" screen may include details of the collected maintenance data, the vehicle status, roadside incident details, and the time that the issue was detected for each repair. In some embodiments, the repair information may include information regarding multiple vehicles of a driver. That is, the driver may employ the car care application 502 to access repair information specific to each one of his or her vehicles. Furthermore, each repair may have an associated number or identifier assigned by the car care application 502 so that the driver may use the identifier during inquiries to an insurance company, service provider, or alternative transportation service (e.g., rental car service) regarding his or her vehicle repair and/or assigned alternative transportation. The user interface shown in FIG. 6A may also provide a map that shows the vehicle's location. For example, a service technician or a service provider may be transporting the vehicle to the repair shop. Thus, the application 502 may notify the driver of the vehicle's whereabouts to keep the driver informed of the repair process.

The user interface in FIG. 6B may depict repair information with respect to an alternative transportation assignment. For example, the car care application 502 may present information regarding the alternative form of transportation provided to the driver during an estimated period of time of repair for the driver's vehicle. The car care application 502 may estimate a period of time needed by one or more service providers to perform a repair based on previous repair times of similar vehicles and based on previous repairs of the one or more service providers. The estimated period of time may also account for the time needed for the one or more service providers to pick up the vehicle, transport the vehicle for repair, and transport the vehicle back to the driver after the repair. The car care application 502 may provide information regarding the estimated period of time for the repair and may update the estimated period of time accordingly based on changes in the service time. For example, the car care application 502 may update the estimated period of time every 10 minutes, every 30 minutes, every hour, every other hour, or another interval in order to provide a more accurate estimate to the driver of how long the repair will take.

As illustrated in the FIG. 6B user interface, the car care application 502 may also inform the driver of a rental car assignment. For example, a rental car may be provided to the driver for the duration of the estimated period of time for the repair. The car care application 502 may provide a picture of and/or details of an assigned rental car to the driver, including the make, model, year, color, and other information of the rental car. In some cases, the car care application 502 may update the period of time that the rental car is provided to the driver based on the driver's preferences. For example, the driver may desire to keep the rental car for a longer period of time because he or she may be travelling out of town when the repair is completed. Thus, the car care application 502 may update the rental time accordingly and inform a rental car service of the update.

Figure 7B:
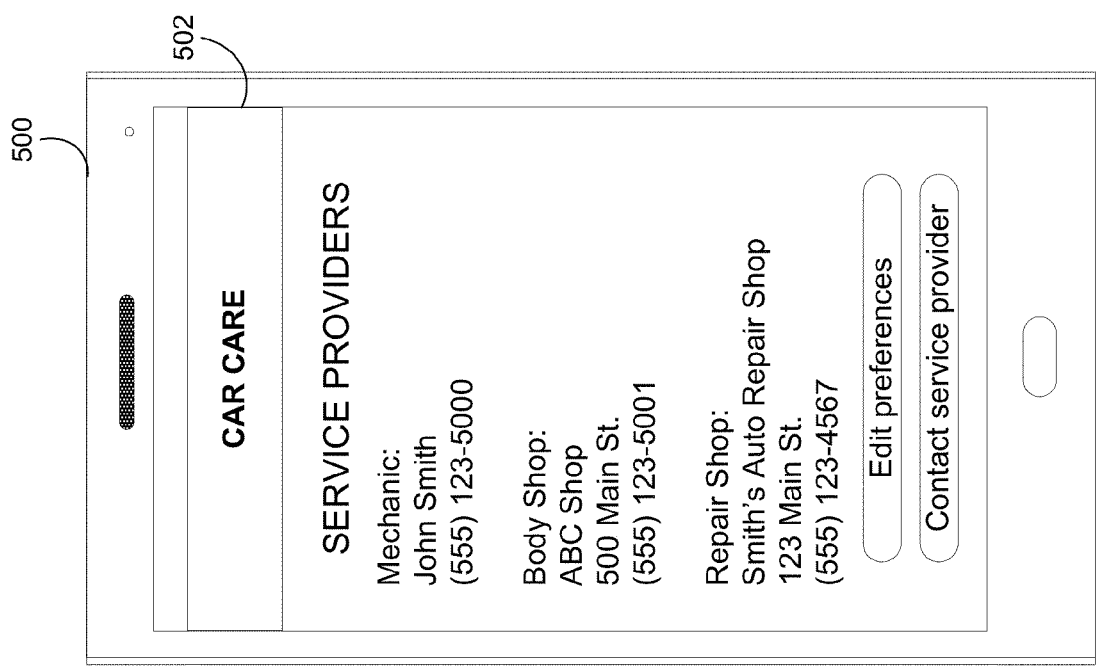
FIGS. 7A and 7B depict an illustrative diagram of example user interfaces of a car care application in accordance with one or more example embodiments.
Figure 7A:
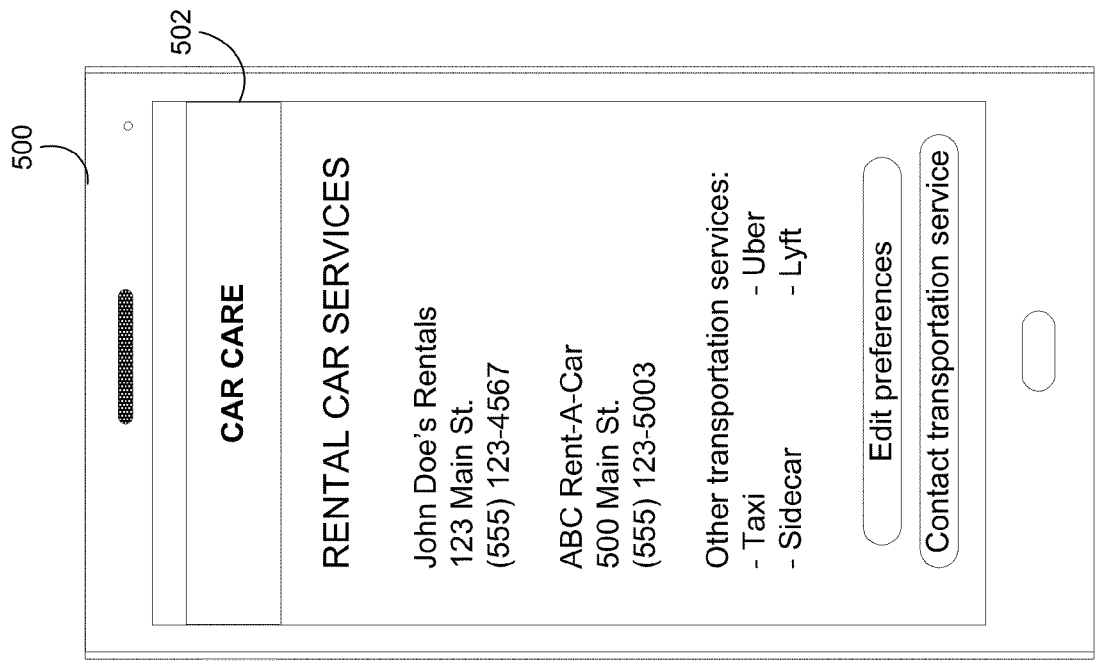

FIGS. 7A and 7B illustrate example user interfaces of utilizing a car care application 502 to view and/or manage information regarding service providers and alternative transportation services. A driver may be able to navigate to the user interfaces shown in FIGS. 7A and 7B by selecting the "Service Providers" and "Rental Car Services" options, respectively, shown in the FIG. 5A user interface. The user interface in FIG. 7A may depict information regarding one or more service providers who are available to perform a vehicle repair for the driver. The driver may be able to select a specific service provider to perform a vehicle repair and also set preferences regarding a preferred service provider for future repairs by selecting the "Edit preferences" option in the FIG. 7A user interface. Additionally, the driver may contact one or more service providers by selecting the "Contact service provider" option in the FIG. 7A user interface in order to inquire regarding a status of a vehicle repair or to receive more information about repair services.

The user interface in FIG. 7B may depict information regarding one or more rental car services and other alternative transportation services available to the driver. The driver may be able to select a specific rental car company from which to rent a car for use during an estimated repair time. In another embodiment, the driver may prefer to use another type of transportation, such as a taxi service or a ridesharing service, during an estimated repair time. The driver may be able to set preferences regarding a preferred alternative form of transportation for future repair times by selecting the "Edit preferences" option in the FIG. 7B user interface. Additionally, the driver may contact one or more transportation services by selecting the "Contact transportation service" option in the FIG. 7B user interface in order to receive additional information about rental cars, taxis, or ridesharing services.

Figure 8B:
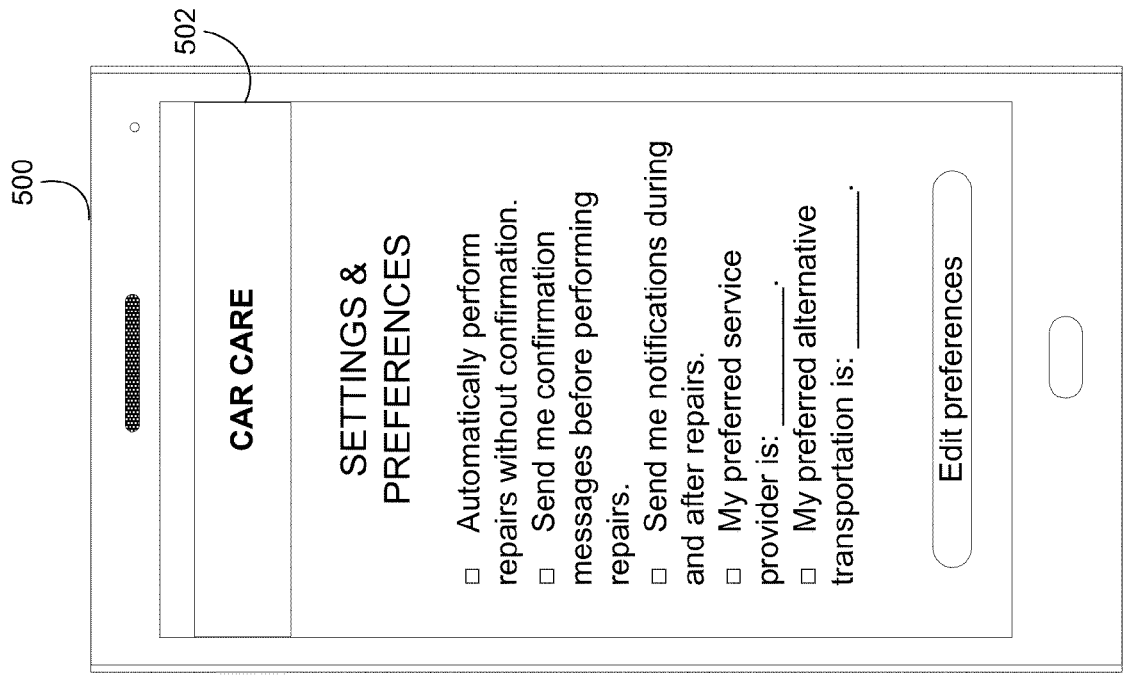
FIGS. 8A and 8B depict an illustrative diagram of example user interfaces of a car care application in accordance with one or more example embodiments.
Figure 8A:
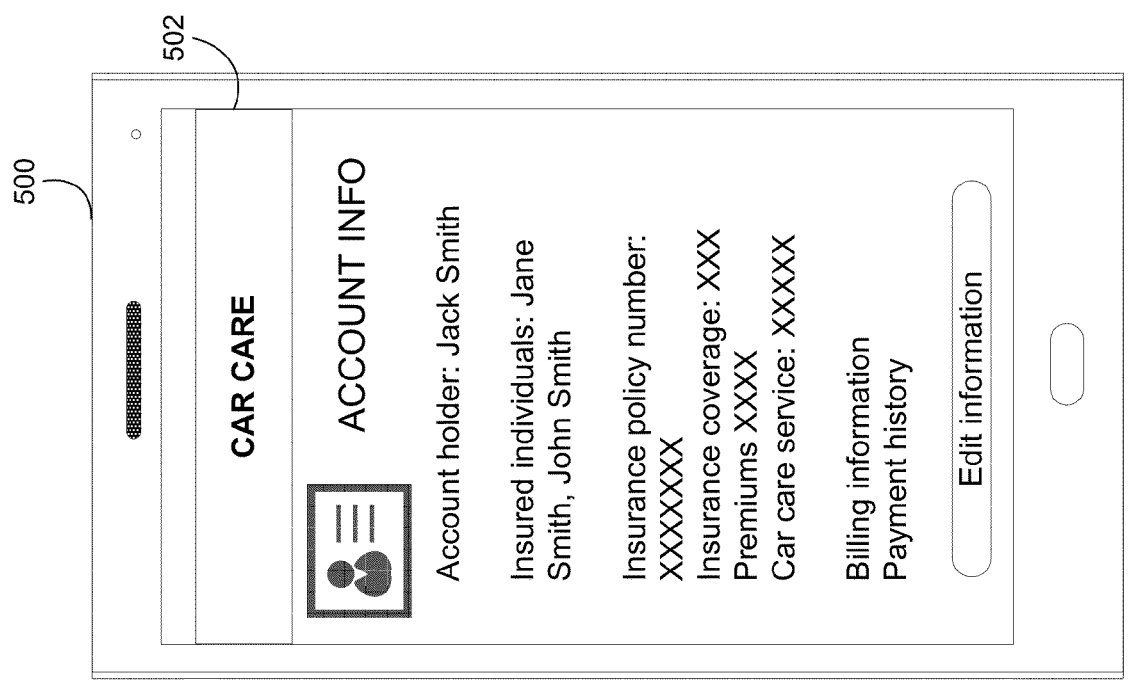

FIGS. 8A and 8B illustrate example user interfaces of utilizing a car care application 502 to view and/or edit account information and preferences, respectively. A driver may be able to navigate to the user interfaces shown in FIGS. 8A and 8B by selecting the "View Account Information" and "Settings & Preferences" options, respectively, shown in the FIG. 5A user interface. The user interface in FIG. 8A depicts example account information corresponding to the driver associated with the vehicle 217. Account information may include an account holder, insured individuals, an insurance policy number, insurance coverage, premiums, deductibles, car care service deductibles, billing information, payment history, and the like. For example, an insurance company may offer car care service to a driver as an additional feature of a specific insurance plan. That is, the driver may purchase an insurance plan and receive car care services, in which the insurance company may agree to pay deductibles for car care repairs. The insurance company may set up the deductibles and premium rates of the car care service for the driver prior to purchase of the insurance plan. The driver may be able to update his or her account information associated with his or her insurance plan or car care service by selecting the "Edit information" option in the FIG. 8A user interface.

The user interface in FIG. 8B illustrates examples of settings and preferences associated with the car care service provided by the car care application 502. That is, the driver may be able to set his or her preferences for whether or not to receive confirmation messages or notifications prior to car care repairs. For example, the driver may prefer for his or her vehicle to be repaired automatically by one or more service providers without necessitating a confirmation message to the driver. In another example, the driver may prefer to receive a confirmation message for authorizing repairs before the one or more service providers pick up the vehicle for repair, as well as notifications during and after repair. In other cases, the driver may also set one or more preferences regarding one or more preferred service providers and alternative forms of transportations (e.g., a rental car service, taxi service, or ridesharing service). Based on his or her personal preferences, the driver may update the settings and preferences for the car care service accordingly.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention. For example, the estimated repair time in step 410 may be determined as part of step 402 or soon thereafter and provided to the user (e.g., driver, insurance policy holder, vehicle owner, etc.) in the repair request sent in step 404.

What is claimed is:
1. A method comprising:
  in a network environment comprising:
    a telematics device associated with a vehicle, the telematics device comprising an on-board diagnostic system in the vehicle and one or more sensors, the telematics device being configured to:
      collect, from an on-board diagnostic system in the vehicle and from the one or more sensors, maintenance data associated with an operating status of the vehicle;
    a computing device of a vehicle service provider;
    a mobile device of a driver of the vehicle, the mobile device comprising a processor, memory and computer-executable instructions stored in the memory, the instructions, when executed by the processor, being configured to:
      cause the mobile device to communicatively couple to the telematics device via a wireless connection;
      cause the mobile device to receive the vehicle telematics data from the telematics device;
      cause the mobile device to receive maintenance data regarding the operating status of the vehicle and the events during the vehicle trip from the telematics device via the wireless connection;
      cause the mobile device to compare the vehicle telematics data with predefined metric data that defines a normal operating condition of the vehicle to determine events occurring during a vehicle trip;

receive a proposed repair notification;

generate and display, by the mobile device, at least one graphical user interface comprising repair options notification and insurance account information associated with the vehicle and comprising information identifying an account holder, one or more insured individuals, an insurance policy number, an insurance premium amount, an insurance deductible amount, and a car care service deductible amount; and capture, by the mobile device via the at least one graphical user interface, a user response to the repair options notification; and a server computer system comprising at least one processor and memory, at the server computer system:

receiving, by the at least one processor, from the mobile device of the driver of the vehicle, the maintenance data regarding the operating status of the vehicle received by the mobile device of the driver of the vehicle from the telematics device;

determining, by the at least one processor, a repair for the vehicle based on the maintenance data from the mobile device of the driver of the vehicle;

based on determining the repair for the vehicle, sending, by the at least one processor, to the computing device of the vehicle service provider, a request for the repair for the vehicle to be performed on the vehicle by the vehicle service provider;

parsing a database accessible to the server computing system to identify a previous repair record of insured vehicles;

based on the previous repair record of insured vehicles, estimating, by the at least one processor, a period of time the vehicle service provider is expected to take to perform the repair, wherein the insured vehicles in the previous repair record have received a type of repair similar to a type of repair currently requested in the request;

based on the estimated period of time, assigning, by the at least one processor, a rental car to be provided to the driver of the vehicle during the estimated period of time for the repair;

sending, by the at least one processor, to the mobile device of the driver of the vehicle, one or more notifications regarding at least one of the repair being performed by the vehicle service provider, the estimated period of time for the repair, or the rental car to be provided to the driver; and responsive to receiving, from the mobile device, the captured user response comprising a selection of an item from the repair options notification, sending, by the at least one processor, to the computing device of the vehicle service provider, a second notification directing the vehicle service provider to drop off the rental car to be provided to the driver in a same spot as where the vehicle is parked, wherein sending the second notification to the computing device of the vehicle service provider causes the computing device of the vehicle service provider to display the second notification directing the vehicle service provider to drop off the rental car to be provided to the driver in the same spot as where the vehicle is parked.

2. The method of claim 1, comprising:

after sending the request for the repair to the computing device of the vehicle service provider, receiving, by the at least one processor, from the computing device of the vehicle service provider, a confirmation indicating that the vehicle service provider will pick up and transport the vehicle to a repair shop.

3. The method of claim 1, wherein sending the request for the repair to the computing device of the vehicle service provider comprises sending location information of the vehicle to the computing device of the vehicle service provider.

4. The method of claim 1, comprising:

receiving, by the at least one processor, from the mobile device of the driver of the vehicle, information regarding one or more issues that the driver has experienced or is experiencing with the vehicle.

5. The method of claim 4, comprising:

determining, by the at least one processor, the repair for the vehicle further based on the information regarding the one or more issues that the driver has experienced or is experiencing with the vehicle.

6. The method of claim 1, wherein the events occurring during the vehicle trip comprise an impact to a part of the vehicle or a deployed airbag.

7. The method of claim 1, wherein the maintenance data indicates one or more vehicle metrics associated with one or more of the vehicle's battery, brakes, engine, fuel economy, radiator, transmission, or tires.

8. The method of claim 1, wherein the operating status of the vehicle is determined based on one or more of mileage, driving behaviors, road conditions, or vehicle type.

9. The method of claim 1, wherein at least one user interface of the car care application executed on the mobile device of the driver of the vehicle comprises an option to view car care notifications, an option to view repair information, an option to view service provider information, an option to view rental car services information, an option to view account information, and an option to view settings and preferences.

10. The method of claim 1, wherein at least one user interface of the car care application executed on the mobile device of the driver of the vehicle comprises an option to submit the driver's recommendations on the repair for the vehicle to modify the repair for the vehicle determined by the server computer system.

11. The method of claim 1, wherein at least one user interface of the car care application executed on the mobile device of the driver of the vehicle comprises information identifying the estimated period of time for the repair.

12. The method of claim 1, wherein at least one user interface of the car care application executed on the mobile device of the driver of the vehicle comprises a picture of the rental car to be provided to the driver, information identifying a make and a model of the rental car to be provided to the driver, and an option for the driver to update a rental time for the rental car to be provided to the driver.

13. A system comprising:

a telematics device associated with a vehicle, the telematics device comprising an on-board diagnostic system in the vehicle and one or more sensors, the telematics device being configured to:

collect, from the on-board diagnostic system in the vehicle and from the one or more sensors, vehicle telematics data associated with an operating status of the vehicle;

a computing device of a vehicle service provider;

a mobile device of a driver of the vehicle, the mobile device comprising a processor, memory and computer-executable instructions stored in the memory, the instructions, when executed by the processor, being configured to:
- cause the mobile device to communicatively couple to the telematics device via a wireless connection;
- cause the mobile device to receive the vehicle telematics data from the telematics device, the vehicle telematics data comprising at least maintenance data regarding the operating status of the vehicle and events during a vehicle trip;
- cause the mobile device to compare the vehicle telematics data with predefined metric data that defines a normal operating condition of the vehicle to determine events occurring during the vehicle trip;
- receive, by the mobile device, a proposed repair options notification;
- generate and display, by the mobile device, at least one graphical user interface comprising the repair options notification and insurance account information associated with the vehicle and comprising information identifying an account holder, one or more insured individuals, an insurance policy number, an insurance premium amount, an insurance deductible amount, and a car care service deductible amount; and
- capture, by the mobile device via the at least one graphical user interface, a user response to the repair options notification; and a server computer system comprising at least one processor and memory storing instructions that, when executed by the at least one processor, cause the server computer system to:
- receive, from the mobile device of the driver of the vehicle, the maintenance data regarding the operating status of the vehicle received by the mobile device of the driver of the vehicle from the telematics device;
- determine a repair for the vehicle based on the maintenance data from the mobile device of the driver of the vehicle;
- based on determining the repair for the vehicle, send, to the computing device of the vehicle service provider, a request for the repair for the vehicle to be performed on the vehicle by the vehicle service provider;
- parse a database accessible to the server computing system to identify a previous repair record of insured vehicles;
- based on the previous repair record of insured vehicles, estimate a period of time the vehicle service provider is expected to take to perform the repair, wherein the insured vehicles in the previous repair record have received a type of repair similar to a type of repair currently requested in the request;
- based on the estimated period of time, assign a rental car to be provided to the driver of the vehicle during the estimated period of time for the repair;
- send, to the mobile device of the driver of the vehicle, one or more notifications regarding at least one of the repair options, repair being performed by the vehicle service provider, the estimated period of time for the repair, or the rental car to be provided to the driver; and
- responsive to receiving, from the mobile device, the captured user response comprising a selection of an item from the repair options notification, send, to the computing device of the vehicle service provider, a second notification directing the vehicle service provider to drop off the rental car to be provided to the driver in a same spot as where the vehicle is parked, wherein sending the second notification to the computing device of the vehicle service provider causes the computing device of the vehicle service provider to display the second notification directing the vehicle service provider to drop off the rental car to be provided to the driver in the same spot as where the vehicle is parked.

14. The system of claim 13, wherein the memory of the server computer system stores additional instructions that, when executed by the at least one processor, cause the server computer system to:
- after sending the request for the repair to the computing device of the vehicle service provider, receive, from the computing device of the vehicle service provider, a confirmation indicating that the vehicle service provider will pick up and transport the vehicle to a repair shop.

15. The system of claim 13, wherein sending the request for the repair to the computing device of the vehicle service provider comprises sending location information of the vehicle to the computing device of the vehicle service provider.

16. The system of claim 13, wherein the memory of the server computer system stores additional instructions that, when executed by the at least one processor, cause the server computer system to:
- receive, from the mobile device of the driver of the vehicle, information regarding one or more issues that the driver has experienced or is experiencing with the vehicle.

17. The system of claim 16, wherein the memory of the server computer system stores additional instructions that, when executed by the at least one processor, cause the server computer system to:
- determine the repair for the vehicle further based on the information regarding the one or more issues that the driver has experienced or is experiencing with the vehicle.

18. The system of claim 13, wherein the events occurring during the vehicle trip comprise an impact to a part of the vehicle or a deployed airbag.

19. The system of claim 13, wherein the maintenance data indicates one or more vehicle metrics associated with one or more of the vehicle's battery, brakes, engine, fuel economy, radiator, transmission, or tires.

20. The system of claim 13, wherein the operating status of the vehicle is determined based on one or more of mileage, driving behaviors, road conditions, or vehicle type.

* * * * *